Sept. 4, 1934.  C. J. CARLSON ET AL  1,972,701
CYCLE PEDAL
Filed May 31, 1932
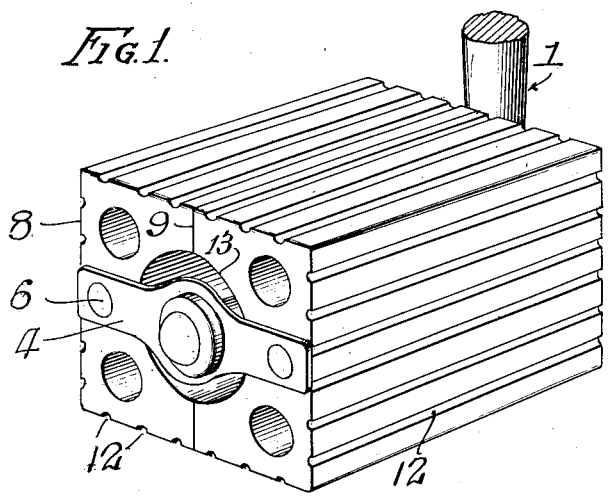
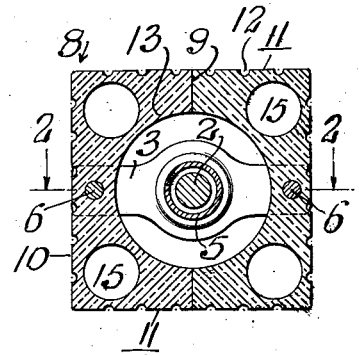
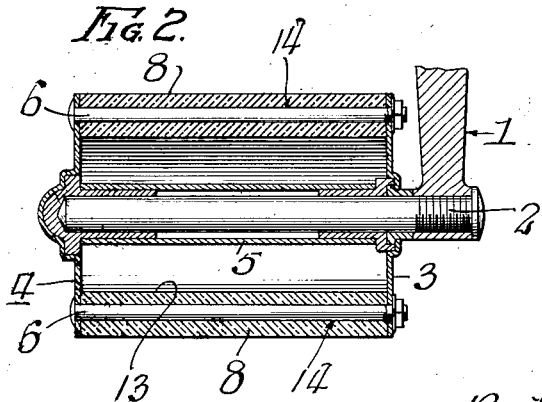
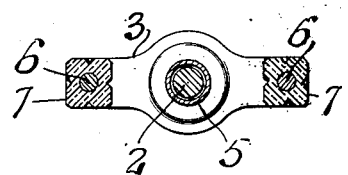
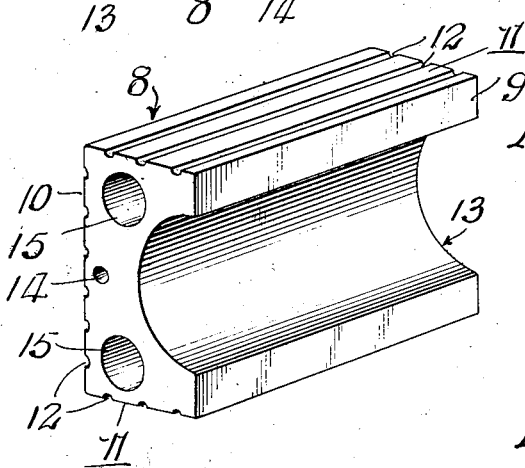
Inventors:
Carl J. Carlson,
Oscar F. Carlson,
By: Arthur McNelson
Atty.

Patented Sept. 4, 1934

1,972,701

UNITED STATES PATENT OFFICE 1,972,701

CYCLE PEDAL

Carl J. Carlson and Oscar F. Carlson, Chicago, Ill.

Application May 31, 1932, Serial No. 614,518

9 Claims. (Cl. 208—70)

This invention relates to improvements in cycle pedals and it consists of the matters hereinafter described and more particularly pointed out in the appended claims.

The conventional pedal for a bicycle as well as for many of the larger sizes of children's velocipedes includes a pedal shaft or spindle and its tube as well as end plates, the latter being operatively connected together by rods disposed parallel with the shaft or spindle and each having the usual pedal rubber mounted thereon.

In the junior sizes of bicycles it is often difficult to find one having that pedal reach adapted for the child who is to ride the same. This reach may be regulated to some extent by lowering the seat post but in many instances, lowering the seat post just fails to provide the desired reach. Thus the purchaser must choose the next smaller size of bicycle which is outgrown by the child in a very short time.

The primary object of the invention is to provide a pedal structure, which may be substituted for the rubbers of a conventional pedal whereby double the number of tread surfaces are provided for the pedal, each spaced from the pedal shaft a considerably greater distance than in the conventional pedal whereby the reach may be adjusted at the pedal as well as at the seat post.

Another object of the invention is to provide a pedal construction wherein certain coacting pedal block sections may be substituted for the conventional pedal rubbers and when thus substituted, surround and enclose the pedal shaft tube and provide four tread surfaces, each spaced from the axis of said shaft a greater distance than that afforded by said conventional pedal rubbers.

The above mentioned objects of the invention, as well as others, together with the many advantages thereof, will more fully appear as we proceed with our specification.

In the drawing:—

Fig. 1 is a perspective view of a cycle pedal embodying our invention.

Fig. 2 is a horizontal sectional view through the same in the plane of the pedal shaft and the pedal rubber supporting rods, the plane of the section being indicated by the line 2—2 of Fig. 3.

Fig. 3 is a transverse vertical sectional view through our improved pedal construction.

Fig. 4 is a view similar to Fig. 3 illustrating a conventional type of cycle pedal.

Fig. 5 is a perspective view of one of a pair of pedal block sections embodying our invention, which may be substituted for the conventional pedal rubbers when necessary to provide our improved pedal construction.

The conventional cycle pedal and in many instances the conventional velocipede pedal includes a pedal spindle and end plates and rods connecting the outer portions of the end plates for the support of the rectangular pedal rubbers as best shown in Fig. 4. However, pedal rubbers found in a conventional pedal have such radial dimensions as to limit the reach between the saddle and pedal and generally present either of two sides for engagement by the foot of the rider.

In accordance with our invention, we withdraw the rods connecting the end plates and remove the conventional pedal rubbers and then substitute a pair of pedal block sections of any suitable material for the pedal rubbers thus removed. The pedal block sections thus substituted, coact to surround and enclose the pedal shaft and its tube and present any one of four tread surfaces to the foot of the rider and which surfaces are all spaced radially from the pedal shaft a greater distance than those two surfaces afforded by the conventional rubbers.

Referring now in detail to that embodiment of the invention, illustrated in the accompanying drawing: 1 indicates as a whole the crank arm of a cycle or velocipede hanger which receives at its outer end the threaded inner end extension of a pedal shaft 2. This shaft is journalled near its end in suitable bearings in the inner and outer end plates 3 and 4 respectively of the pedal and is enclosed in a tube 5. 6 indicates the removably engaged rods or pins connecting the outer portions of the end plates together and which in the conventional pedal construction has mounted thereon, the usual pedal treads constituting blocks 7 as best shown in Fig. 4. In the conventional pedal construction, such blocks are each of a rectangular cross section having such dimensions, that the foot engaged thereon is spaced but a short distance above the pedal shaft and the tube enclosing the same.

In our improved construction, we provide a pedal block made up in two sections, each adapted for substitution on the pedal rods for the conventional rubbers, said sections coacting to enclose the shaft and its tube and present twice the number of full breadth tread surface afforded by the usual rubbers and each spaced a greater distance from said shaft.

In Fig. 5, we have illustrated one form of pedal block section 8 which is preferably made of rubber although it could be made of any other suitable material such as wood or metal. The pedal block section shown is of a length approximating the distance between the end plates of the pedal with which it is to be used and is of a width approximating one half its height. Thus when placed in operative relation with a similar block section, said block sections provide a pedal block of square cross section having four full tread surfaces.

Each pedal block section has outer and inner sides 9 and 10 repectively and a top and bottom 11—11, the outer side and the top and bottom being formed to present a roughened surface from which the foot will not easily slip. We find one convenient way in which to provide such roughened surface is to form longitudinally extending grooves 12 in said surfaces.

Each block section is provided on its inner side with a longitudinal groove 13 of substantial radius and in each block section between its top and bottom surface and between its outer surface and the groove, we provide an opening 14 of a diameter to receive a rod 6. To lighten up the block sections, we also provide longitudinal openings 15.

In substituting our improved construction, for the conventional pedal rubbers, the nuts associated with the rods 6 are removed and the rods are withdrawn through the outer end plate and the conventional pedal rubbers 7 are then discarded. We then take a pair of the improved block sections and insert them in place from opposite outer portions of the end plates, with the inner faces of said block sections facing each other. When said inner faces are brought into engagement with each other, the grooves 13 coact to provide a channel about the pedal shaft tube so that said block sections enclose said tube and this brings the openings 14 in each block in line with the holes in the end plates for the rods 6.

The rods 6 are then restored in place from the outer end plate and the nuts then reapplied. The block sections then coact to provide a pedal block that encloses the pedal tube and presents four tread surfaces for the pedal as a whole, any one of which may be engaged by the foot of the rider and each of which surfaces is spaced a distance from the pedal shaft greater than that distance afforded by the pedal rubbers in a conventional pedal arrangement.

Thus with our improved construction, it is possible to fit the reach of an oversize cycle or the like to a rider who under ordinary conditions with conventional pedals would have to use a smaller size cycle which would soon be outgrown.

Our improved construction has another advantage in that a novice rider need not "feel" with the foot for a pedal surface because any surface with which the foot is engaged provides such a pedal surface.

While in describing our invention, we have referred in detail to the form and arrangement of the parts thereof the same is to be considered merely as illustrative so that we do not wish to be limited thereto except as may be specifically set forth in the appended claims.

We claim as our invention:—

1. A cycle or like pedal embodying therein a pedal frame including end plates and a pedal shaft operatively engaged therewith, a pedal block comprising a pair of block parts arranged upon opposite sides of said frame and shaft and operatively connected together and providing more than two tread surfaces for the foot of the operator.

2. A cycle or like pedal embodying therein a pedal frame including end plates and a pedal shaft operatively engaged therewith, a pedal block of a square cross section comprising a pair of block parts, each having a groove arranged upon opposite sides of the shaft and having openings therein and means associated with said frame and passing through said openings to secure said parts in operative position upon said frame so that they cooperate in presenting any one of four tread surfaces to the foot of the operator.

3. A cycle or like pedal embodying therein a pedal frame including a shaft and end plates and rods connecting the outer portions of said end plates and a pedal block surrounding said shaft and mounted on said rods between said end plates and providing two pairs of substantially parallel tread surfaces with the tread surfaces in one pair disposed at a right angle to those of the other pair.

4. A cycle or like pedal embodying therein, a pedal frame including a shaft and end plates and rods connecting the outer portion of said end plates and a pair of pedal block sections each mounted on a rod between said end plates and engaging each other in a manner surrounding said shaft and cooperating to provide a pedal block having four tread surfaces, any one of which may be engaged by the foot of the operator.

5. A cycle or like pedal embodying therein, a pedal frame including a shaft and end plates and rods connecting the outer portions of said end plates and a pair of pedal block sections each mounted on a rod between said end plates and each including an inner face having a groove therein, an outer face and top and bottom faces, said inner faces when engaged with each other preventing relatively turning movement between said sections and the several faces providing tread surfaces, any one of which may be engaged by the foot of the operator.

6. A cycle or like pedal embodying therein, a pedal frame including a shaft and end plates and rods connecting the outer portions of said end plates and a pair of pedal block sections, each mounted on a rod between said end plates, said pedal block sections when engaged with each other, providing a pedal block surrounding said shaft and providing at least four tread surfaces, spaced equal distances from said shaft and any one of which surfaces may be engaged by the foot of the operator.

7. In a pedal construction, a pair of pedal block sections having inner faces opposed to each other, said block sections when thus arranged providing a pedal block having a central longitudinal opening therein and having at least four tread surfaces arranged at a right angle to each other and each adapted for engagement by the foot of the operator.

8. A pedal block section for a cycle pedal comprising a member having inner and outer faces and top and bottom faces, the inner face having a groove therein to partially surround a pedal shaft and said member having openings therein, one of which is adapted to receive means by which said block section may be secured in operative relation with respect to a pedal shaft frame plate.

9. A cycle or like pedal embodying therein a pedal frame including a shaft tube and end plates and members connecting the end plates of said pedal frame and means comprising oppositely facing block members so secured to the pedal as to substantially surround said shaft tube and to form a pedal block having four foot engageable surfaces arranged at a right angle to each other.

CARL J. CARLSON.
OSCAR F. CARLSON.